(12) United States Patent
Ranade et al.

(10) Patent No.: US 7,962,710 B1
(45) Date of Patent: Jun. 14, 2011

(54) TECHNIQUES FOR CREATING CHECKPOINTS

(75) Inventors: Dilip Madhusudan Ranade, Kothrud (IN); Niranjan S. Pendharkar, NCL/Pashan (IN); Aalop S. Shah, Aundhm (IN)

(73) Assignee: Symantec Corporation, Mountain View, CA (US)

( * ) Notice: Subject to any disclaimer, the term of this patent is extended or adjusted under 35 U.S.C. 154(b) by 513 days.

(21) Appl. No.: 11/835,795

(22) Filed: Aug. 8, 2007

(51) Int. Cl.
*G06F 12/00* (2006.01)
(52) U.S. Cl. ....................................................... 711/162
(58) Field of Classification Search .................. None
See application file for complete search history.

(56) References Cited

U.S. PATENT DOCUMENTS

| | | | | |
|---|---|---|---|---|
| 6,898,681 | B2 * | 5/2005 | Young | 711/162 |
| 7,761,421 | B2 * | 7/2010 | Frolund et al. | 707/637 |
| 2004/0024954 | A1 * | 2/2004 | Rust | 711/100 |

OTHER PUBLICATIONS

Tanenbaum, "Structured Computer Organization", © 1984 Prentice-Hall, Inc., p. 10-12.*

Christopher Clark et al.; *Live Migration of Virtual Machines*; USENIX Association; NSDI 2005: $2^{nd}$ Symposium on Networked Systems Design & Implementation; pp. 273-286.
Mimosa Systems Datasheet; *Mimosa NearPoint for Microsoft Exchange Server*; website printout; www.mimosasystems.com; Dec. 20, 2007; 4 pages.
Mimosa Systems Datasheet; *Mimosa NearPoint eDiscovery Option*; website printout; www.mimosasystems.com; Dec. 20, 2007; 4 pages.
Mimosa Systems Datasheet; *Mimosa NearPoint Disaster Recovery Option*; website printout; www.mimosasystems.com; Dec. 20, 2007; 4 pages.
Mimosa Systems Datasheet; *Mimosa NearPoint PST Archiving Option*; website printout; www.mimosasystems.com; Dec. 20, 2007; 4 pages.

* cited by examiner

*Primary Examiner* — Brian R Peugh
(74) *Attorney, Agent, or Firm* — Hunton & Williams LLP

(57) ABSTRACT

Techniques for creating checkpoints are disclosed. In one particular exemplary embodiment, the techniques may be realized as a method for creating file system checkpoints comprising the steps of modifying a first data block and a second data block with a first transaction, associating the first data block with a first stamp, and associating the second data block with a second stamp, wherein the first stamp and the second stamp are substantially similar.

10 Claims, 5 Drawing Sheets

TECHNIQUES FOR CREATING CHECKPOINTS

FIELD OF THE DISCLOSURE

The present disclosure relates generally to continuous data protection and, more particularly, to techniques for creating checkpoints.

BACKGROUND OF THE DISCLOSURE

A continuous data protection ("CDP") system associated with a target system may capture changes to memory blocks associated with one or more changes in a file system or memory of the target system. The target system may, for example, be a server or other computerized system in which it may be advantageous to have the ability to create one or more snapshots of the current state of the file system or memory. The target system may operate one or more applications, which may be operable to create changes to the memory. The changes to the memory may be handled by a memory cache, which then may create one or more changes to the file system.

The target system may be operable to transmit each changed memory block to the CDP system. Either the target system or the CDP system may associate each changed block with a time stamp denoting the current time. The CDP may store the changed blocks and the associated time stamps in a file system or memory such as, for example, in one or more files on a hard disk drive or in a database. Should the file system or memory need to be restored, a time for restoration may be used. For example, the file system or memory may be recreated as it existed at a time T1. The CDP may be operable to recreate the file system or memory at time T1 using all of the blocks that the CDP received on or before time T1.

Problems with the above-described CDP systems may arise because one or more discrete blocks may not always encompass an entire change or transaction to the file system or memory. In other words, the memory changes created by one or more of the applications on the target system may not be fully embodied in the CDP system at time t1. A restore at time T1 may create a file system or memory that is internally inconsistent, and may also creating inconsistencies at the application level. For example, a block containing a part of file x.dat may have been transmitted to the CDP before time T1, but another block containing another part of file x.dat may have been transmitted to the CDP after time T1. Therefore, a restore of the file system or memory to time T1 may yield a partial change to file x.dat, possibly resulting in a file corruption issue. Or, the file x.dat may have been fully transmitted to the CDP, but metadata describing file x.dat may not have been transmitted to the CDP system, or vice versa. So the metadata describing the file may be inconsistent with the file itself if a restore is required between a time the file was transferred to the CDP system and a time the metadata was transferred to the CDP system. This problem may be replicated across many different files. The file system or memory thus must be placed into a consistent state before it may be fully restored for use. This operation of placing a file system or memory in a consistent state may be very expensive in terms of time and processor or memory resources.

In view of the foregoing, it may be understood that there are significant problems and shortcomings associated with current continuous data protection technologies.

SUMMARY OF THE DISCLOSURE

Techniques for creating checkpoints are disclosed. In one particular exemplary embodiment, the techniques may be realized as a method for creating file system checkpoints comprising the steps of modifying a first data block and a second data block with a first transaction, associating the first data block with a first stamp, and associating the second data block with a second stamp, wherein the first stamp and the second stamp are substantially similar.

In accordance with other aspects of this particular exemplary embodiment, the method further comprises transmitting the first data block and the first stamp to a continuous data protection system.

In accordance with further aspects of this particular exemplary embodiment, the method further comprises transmitting the second data block and the second stamp to a continuous data protection system.

In accordance with additional aspects of this particular exemplary embodiment, a third data block is associated with a third stamp, where the third stamp is dissimilar to the first stamp and the second stamp and where the third block is modified by a second transaction.

In accordance with further aspects of this particular exemplary embodiment, the method further comprises creating a shadow block of the second data block and associating the shadow block with a third stamp, where the third stamp is dissimilar to the first stamp and the second stamp and where the shadow block is modified by a second transaction.

In accordance with additional aspects of this particular exemplary embodiment, the method further comprises associating a first time stamp with the first data block, and associating a second time stamp with the second data block.

In accordance with further aspects of this particular exemplary embodiment, at least one signal embodied in at least one carrier wave for transmitting a computer program of instructions configured to be readable by at least one processor for instructing the at least one processor to execute a computer process for performing the method as recited is provided.

In accordance with additional aspects of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as a system for creating file system checkpoints comprising an I/O module operable to transmit one or more data blocks, a CDP module operable to transmit one or more data blocks to one or more CDP systems, a stamp module operable to associate a stamp to the one or more data blocks before transmission by the CDP module.

In accordance with other aspects of this particular exemplary embodiment, the I/O module, the CDP module, and the stamp module are in communication with each other.

In accordance with further aspects of this particular exemplary embodiment, the CDP module is in communication with a CDP system.

In another particular exemplary embodiment, the techniques may be realized as a system for system for creating file system checkpoints comprising means for associating a first data block with a first stamp, and means for associating a second data block with a second stamp, where the first stamp and the second stamp are substantially similar and where the first data block and the second data block are modified by a first transaction.

In accordance with other aspects of this particular exemplary embodiment, the system further comprises means for transmitting the first data block and the first stamp to a continuous data protection system.

In accordance with further aspects of this particular exemplary embodiment, the system further comprises means for transmitting the second data block and the second stamp to a continuous data protection system.

In accordance with additional aspects of this particular exemplary embodiment, a third data block is associated with a third stamp, where the third stamp is dissimilar to the first stamp and the second stamp and where the third block is modified by a second transaction.

In accordance with additional aspects of this particular exemplary embodiment, the system further comprises creating a shadow block of the second data block and associating the shadow block with a third stamp, where the third stamp is dissimilar to the first stamp and the second stamp and where the shadow block is modified by a second transaction.

In accordance with additional aspects of this particular exemplary embodiment, the system further comprises means for associating a first time stamp with the first data block, and means for associating a second time stamp with the second data block.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

The description below is intended to be exemplary of the techniques for creating checkpoints embodied in the present disclosure. An example of a file system is used for illustrative purposes, but the present disclosure may be used according to other embodiments to create a application consistent or application level checkpoints.

Figure 1:
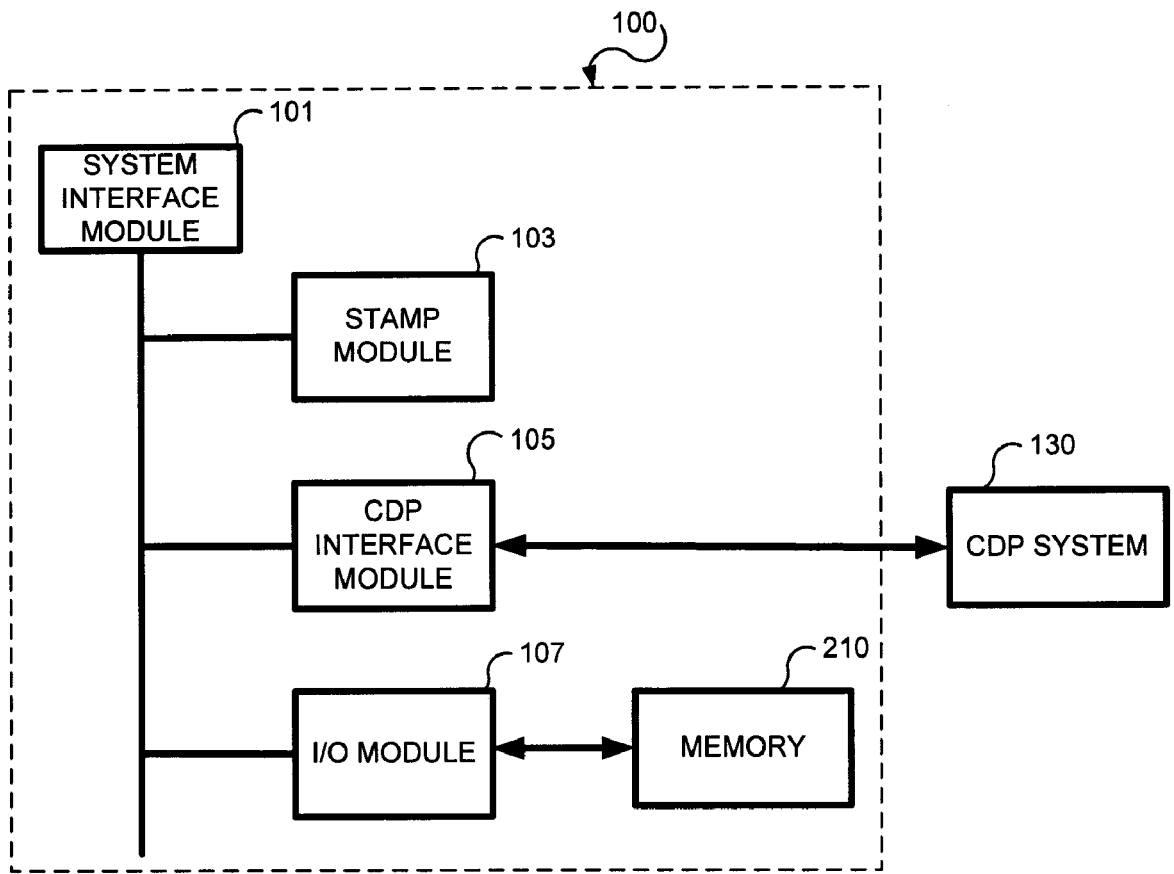
FIG. 1 shows a diagram view of a system including a continuous data protection system in accordance with an embodiment of the present disclosure.

Referring to FIG. 1, a diagram level overview of a system 100 is shown in accordance with an embodiment of the present disclosure. The system 100 may comprise a system interface module 101, a stamp module 103, a CDP interface module 105, and an input/output ("I/O") module 107. Each module may interact with each other module. In one embodiment, the modules may be contained within one physical system, but this is not necessary. In another embodiment, one or more modules may be placed on one or more physical systems, for example on one or more computers. The one or more computers, and the one or more modules which may reside on the one or more computers, may be in communication via a network. The system 100 may contain one or more modules, such as the system interface module 101, the stamp module 103, the CDP interface module 105, or the I/O module 107. Each module will be explained in more detail below.

The system interface module 101 may be operable to permit or allow some or all of the other modules to interact with one another. The interaction may allow one or more of the modules to transmit signals to another one or more of the modules, or the system interface module 101 may selectively permit signals to be transmitted between one or more modules. The signals may constitute packets of data, or other types of signals transmitted between one or more modules and one or more other modules.

The stamp module 103 may be operable to associate one or more stamps with one or more data blocks. The data blocks may be located on the same system 100 as the stamp module 103, or may be located on another system in communication with the stamp module 103. For example, the stamp module 103 may associate stamps with one or more stores of random access memory ("RAM") on the system 100. Or, the stamp module 103 may associate stamps with one or more electronic files on a storage area network, or another networked file system, or may utilize one or more networks, including, without limitation, the internet, to read one or more electronic files from a remote system.

The CDP interface module 105 may be in communication with a continuous data protection system 130 ("CDP system"). The CDP interface module 105 may be operable to send one or more data blocks, or one or more data blocks with an associated stamp, to the CDP system 130.

The CDP system 130 may be another system, separate from the system 100, or may be located within the same physical space. If the CDP system 130 and the system 100 are located separately from one another, then the CDP system 130 and the system 100 may be in communication with one another. The method of communication may take any form of communicating data between systems. For example, the system 100 and the CDP system 130 may communicate via a wire or a wireless link, or may be connected via a network. The CDP system 130 may contain one or more CDP stores, operable to store the data blocks communicated via the CDP interface module 105. The one or more CDP stores may be one or more electronic files, or may be contained within one or more databases. The CDP system 130 may be operable to recall one or more of the one or more data blocks communicated via the CDP interface module 105 and stored in one or more of the one or more CDP stores.

The I/O module 107 may be operable to read input from one or more input devices and write output to one or more output devices. The I/O module 107 may be in communication with memory or storage devices 210 associated with the system 100, and may be in communication with the CDP interface module 105, so that data blocks modified by the system 100 may be communicated to the memory or storage devices 210 associated with the system 100 and also with the CDP interface module 105.

Figure 2:
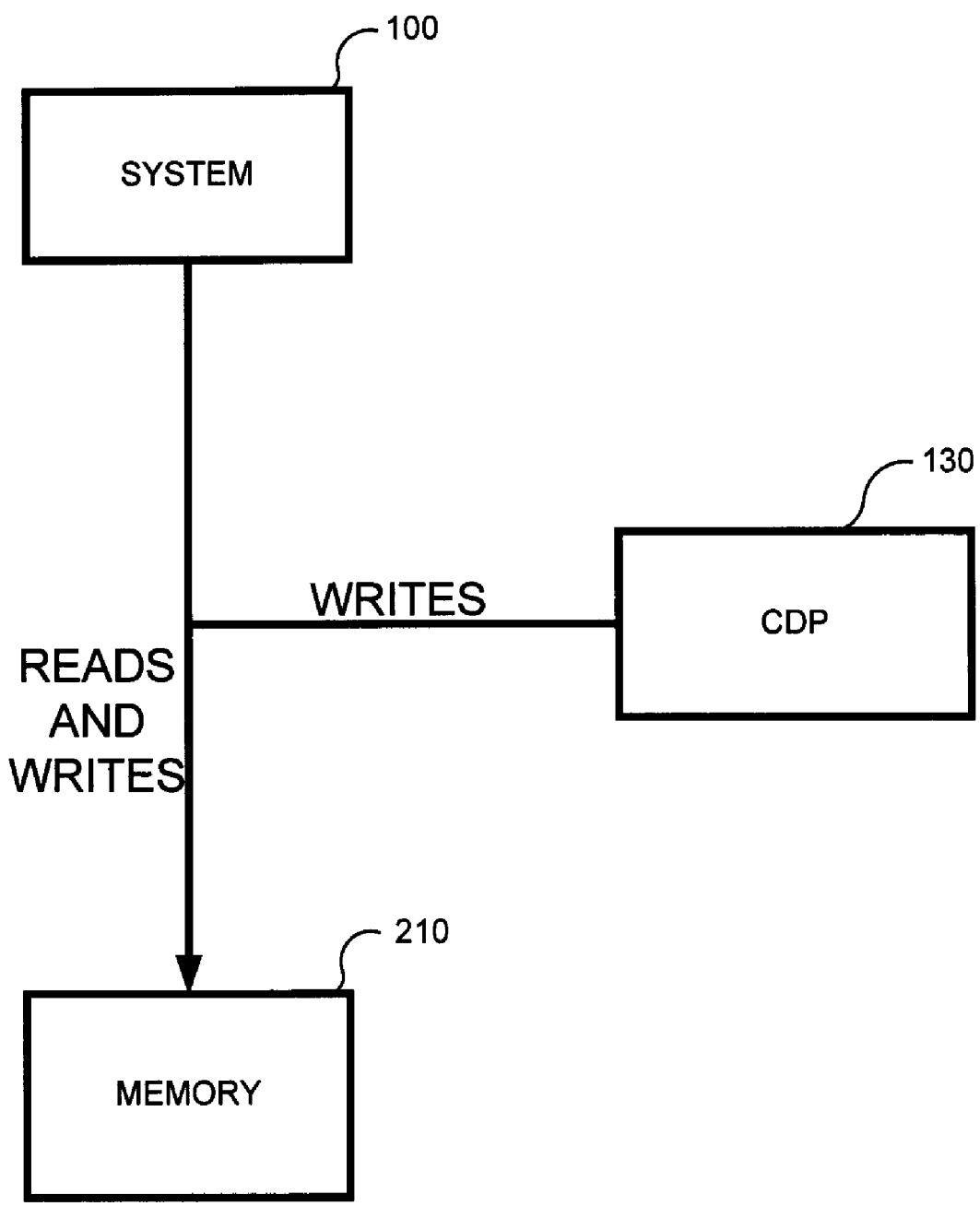
FIG. 2 shows the flow of data from a system to a continuous data protection system in accordance with an embodiment of the present disclosure.

Turning now to FIG. 2, a flow of data from the system 100 to the CDP system 130 is shown in accordance with an embodiment of the present disclosure. The system 100, and the memory and storage devices 210 associated with the system 100, may be in communication. The memory and storage devices 210 associated with the system 100 may include, but are not limited to, RAM, a magnetic hard drive, optical storage, or a tape drive. The system 100 may read information from the memory and storage devices 210, and may write information to the memory and storage devices 210. Reading and writing information may occur by requesting one or more blocks from the memory and storage devices 210, and writing one or more blocks to the memory and storage devices 210. When the system 100 sends an updated memory block to the memory and storage devices 210, the stamp module 103, either working with the I/O module 107 and/or the CDP interface module 105 or separate from the I/O module 107 and CDP interface module 105, may associate the updated memory block with a stamp. The updated memory block and the associated stamp may then be transmitted to the CDP system 130 via the CDP interface module 105. Therefore, the updated memory block may be transmitted to the memory and storage devices 210, but the updated memory block may also be associated with a stamp and transmitted, and may be stored in the CDP system 130.

Figure 3:
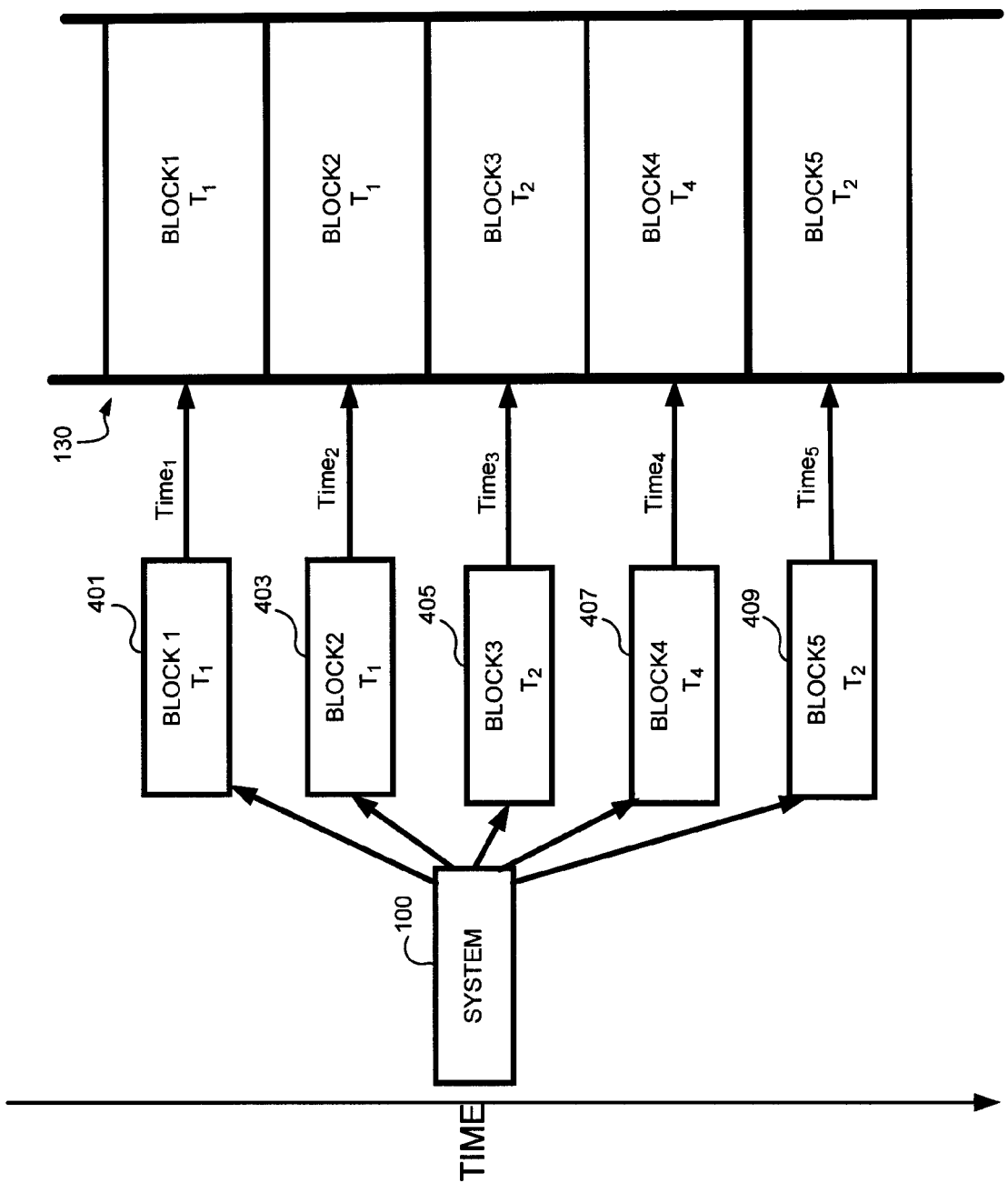
FIG. 3 shows a diagram of a system transmitting blocks to a CDP system in accordance with an embodiment of the present disclosure.

Turning now to FIG. 3, a diagram of the system 100 transmitting blocks to the CDP system 130 is shown in accordance with an embodiment of the present disclosure. Blocks in the diagram may be transmitted sequentially from the top of the diagram to the bottom of the diagram. For example, the system 100 may create and transmit Block1 401 at a time Time1, Block2 403 at a time Time2, Block3 405 at a time Time3, Block4 407 at a time Time4, and Block5 409 at a time Time5. However, Block1 401 and Block2 403 may contain pieces of the same logical file for example, or Block1 401 may contain a logical file and Block2 403 may contain metadata describing the file contained in Block1 401 that are a part of the same transaction.

In the embodiment of the present disclosure, the stamp module 103 may be operable to associate a time stamp with one or more data blocks which may or may not be the current time. For example, the stamp module 103 may associate a stamp T1 with Block1 401, and the system 100 may transmit Block1 401 associated with stamp T1 to the CDP system 130. The stamp module 103 may also associate a stamp T1 with Block2 403, and the system 100 may transmit Block2 403 associated with stamp T1 to the CDP system 130, even though Block2 403 was transmitted to the CDP system 130 at a time Time2. The CDP system 130 may thus store Block1 401 with a stamp of T1 and Block2 403 with a stamp of T1.

A similar procedure may be followed even if associated blocks are not consecutively transferred to the CDP system 130. For example, in FIG. 3, Block3 405 and Block5 409 may contain information about a single file, similar to Block1 401 and Block2 403. The system 100 may associate Block3 405 and Block5 409 together and may assign a stamp of T2 to Block3 405. If Block3 405 is transmitted to the CDP system 130, the system 100 may transmit other blocks to the CDP system 130 between Block3 405 and Block5 409. In this example, Block4 407, which may be a memory block unrelated to the file or files contained in Block3 405 and Block5 409, may be transmitted to the CDP system 130 at time Time4. Block4 407 may be associated with a different stamp than Block3 405 and Block5 409, since the file or files in Block4 407 may be different than in Block3 405 and Block5 409. After Block4 407 is transmitted to the CDP system 130 at a time Time4, Block5 409, associated with stamp T2, may be transmitted to the CDP system 130 at a time Time5.

The CDP system 130 may receive data blocks from the system 100 and may store each data block along with the stamp that is associated with it. The CDP system 130 may be operable to transmit one or more data blocks to the system 100, and may be operable to selectively transmit data blocks to the system 100 based on a selected stamp. For example, if the system 100 requested a restoration image at time Time1, the CDP system 130 may transmit Block1 401 and Block2 403 to the system 100, even though Block2 403 may have been transmitted to the CDP system 130 at a time Time2, since the system 100 and the stamp module 103 may have associated it with a stamp T1. If the system 100 requested a restoration image at time Time2, the CDP system 130 may transmit Block1 401, Block2 403, Block3 405, and Block5 409 to the system 100. Block5 409 may be transmitted to the system 100 from the CDP system 130 because it may be associated with a stamp T2, even though it may have been transmitted at a time Time5. Block4 407 may not be transmitted to the system 100, as it may have been transmitted at a time Time4, and may contain a stamp of T4. Of course, the system 100 may transmit more or fewer blocks; FIG. 3 is intended as exemplary of one possible process.

Figure 4:
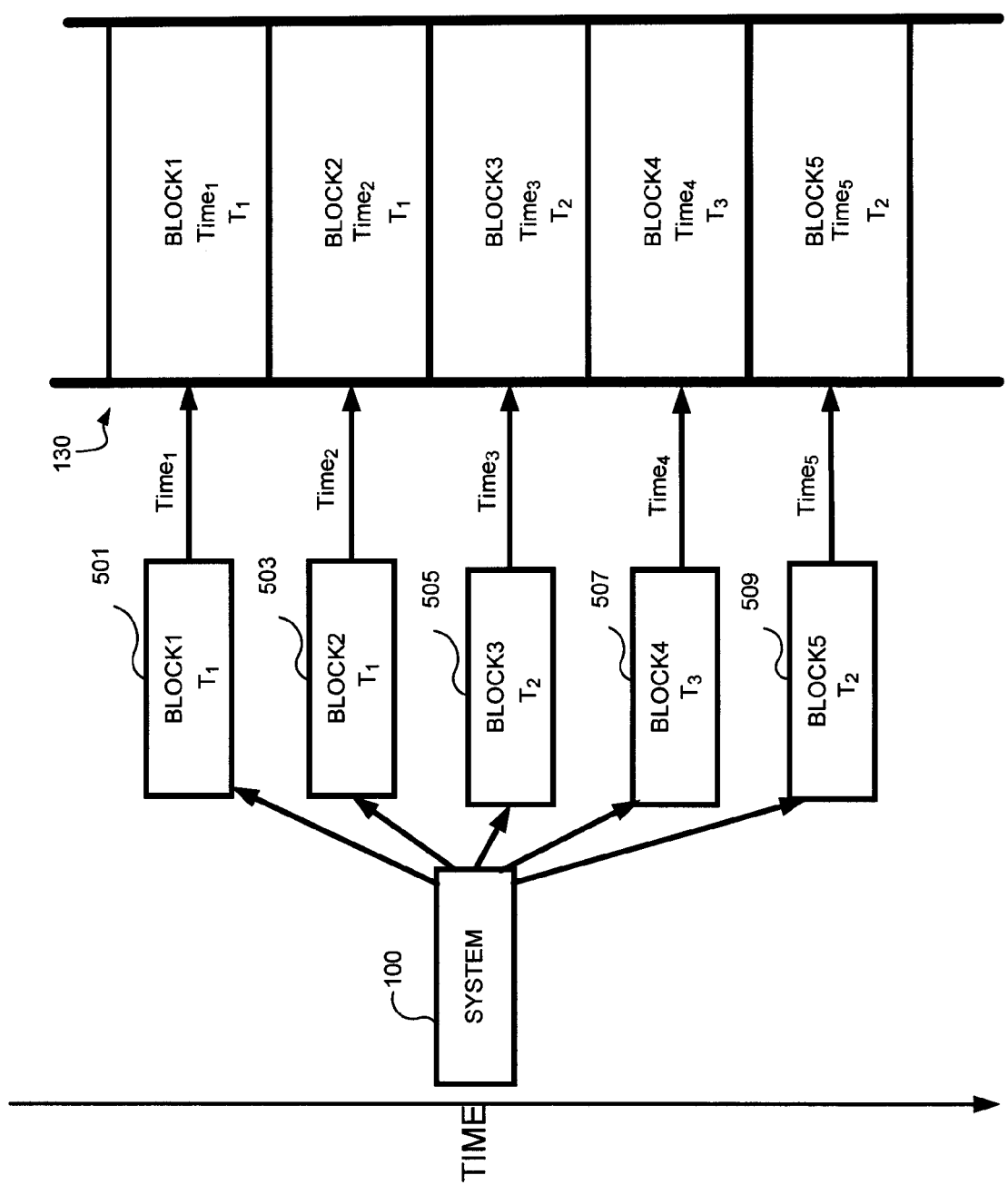
FIG. 4 shows a diagram of a system transmitting blocks to a CDP system in accordance with another embodiment of the present disclosure.

Turning now to FIG. 4, a diagram of the system 100 transmitting blocks to the CDP system 130 is shown in accordance with another embodiment of the present disclosure. In this embodiment, the system 100 may associate two or more stamps with the data blocks when transmitting them to the CDP system 130. Blocks in the diagram may be transmitted sequentially from the top of the diagram to the bottom of the diagram. One stamp may be a unique identifier, and may be similar to the stamp described above. Another stamp may be a time stamp written by the system 100 or the CDP system 130. The time stamp may reflect the current time at the system 100 or the CDP system 130, or may reflect another time. The time stamp may be unique to each data block, or the time recorded within the time stamp may be long enough for one or more blocks to share the same time stamp.

For example, the stamp module 103 may associate a stamp T1 with Block1 501, and the system 100 may transmit Block1 501 associated with stamp T1 to the CDP system 130 at a time T1. The stamp module 103 may also associate a stamp T1 with Block2 503, and the system 100 may transmit Block2 503 associated with stamp T1 to the CDP system 130 at a time T2. The CDP system 130 may thus store Block1 501 with a stamp of T1 and a time stamp of Time1, and Block2 503 with a stamp of T1 and a time stamp of Time2.

A similar procedure may be followed even if associated blocks are not consecutively transferred to the CDP system 130, similar to FIG. 3. For example, in FIG. 4, Block3 505 and Block5 509 may contain information about a single file, similar to Block1 501 and Block2 503. The system 100 may associate Block3 505 and Block5 509 together and may assign a stamp of T2 to Block3 505. If Block3 505 is transmitted to the CDP system 130 at a time Time3, the system 100 may transmit other blocks to the CDP system 130 between Block3 505 and Block5 509. In this example, Block4 507, which may be a memory block unrelated to the file or files contained in Block3 505 and Block5 509, may be transmitted to the CDP system 130 at a time Time4. Block4 507 may be associated with a different stamp than Block3 505 and Block5 509, since the file or files in Block4 507 may be different than in Block3 505 and Block5 509. After Block4 507 is transmitted to the CDP system 130 at a time Time4, Block5 509, associated with stamp T2, may be transmitted to the CDP system 130 at a time Time5.

The CDP system 130 shown in FIG. 4 may operate similarly to the CDP system 130 shown in FIG. 3, except that the CDP system 130 shown in FIG. 4 may be operable to store data blocks and associate two or more stamps with the data blocks. For example, when the system 100 transmits data Block1 501 with associated stamp T1 to the CDP system 130 at time Time1, the CDP system 130 may be operable to store data Block1 501 and also store the stamp T1 and time stamp Time1 associated with Block1 501. When the system 100 transmits data Block2 503 with associated stamp T1 to the CDP system 130 at time Time2, the CDP system 130 may be operable to store data Block2 503 and also store the stamp T1 and time stamp Time2 associated with Block2 503.

The CDP system 130 may be operable to transmit one or more of the data blocks to the system 100 based on any of the stamps, or based on a combination of one or more of the two or more stamps. For example, if the system 100 requested all data blocks on before a time Time2, the CDP module 105 may be operable to transmit the data blocks that had a time stamp of the time on or before time Time2. The CDP system 130 may also be operable to transmit the data blocks that had a time stamp of the time on or before time Time2, as well as blocks that had similar stamps to the blocks with a time stamp of the time on or before time Time2, even if the data blocks had a time stamp after time Time2. In the FIG. 4 example, if the system 100 requested all blocks on or before time Time1, the CDP system 130 may be operable to transmit both Block1 501 and Block2 503, because Block1 501, which has a time stamp of time Time1, also shares a stamp T1 with Block2 503, even though Block2 503 has a time stamp of time Time2.

Figure 5:
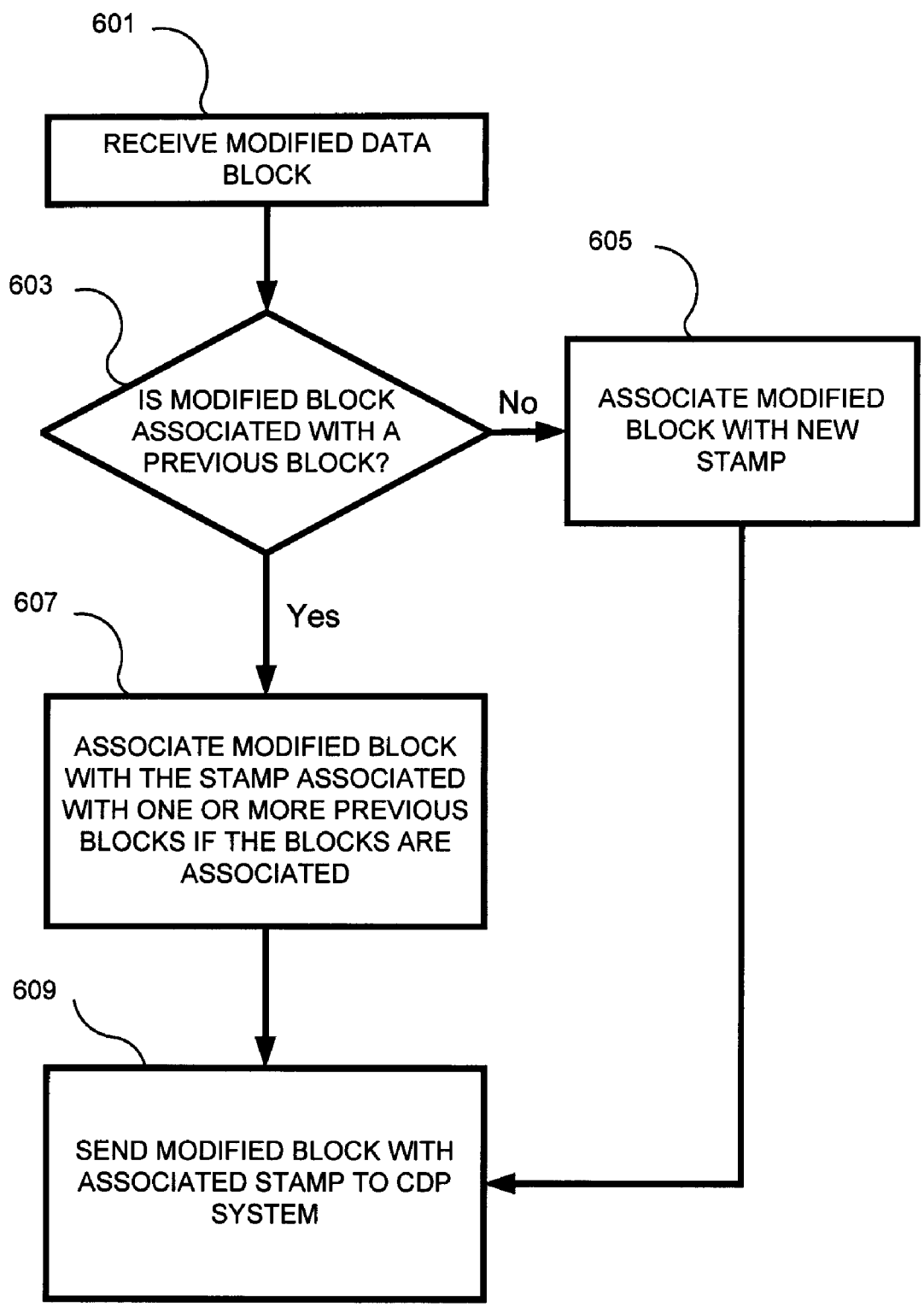
FIG. 5 shows a flow chart of a method for transmitting blocks to a CDP system in accordance with an embodiment of the present disclosure.

Referring now to FIG. 5, a flow chart of a method for transmitting blocks to the CDP system 130 is shown in accordance with an embodiment of the present disclosure. As shown in block 601, the system 100 may receive or generate a modified data block. As shown in block 603, the system 100 may make a determination that the modified data block from block 601 is associated with a data block generated or received previously, or may be associated with a data block generated or received after the data block shown in block 601. The system 100 may associate two or more blocks if, for example, they contain parts of one or more common files, or if the blocks have been previously associated, or another method may be used to determine if two or more blocks may be associated with one another.

If the data block from block 601 is associated with a previous block, then the system 100 may assign the stamp associated with the previous data block to the data block, as shown in step 607. If the data block from block 601 is not associated with a previous block, then the system 100 may assign a new stamp to the data block, as shown in block 605. A block may have a stamp associated with a previous data block, or may have a new stamp associated with it. Additionally, other stamps may be associated with the data block from block 601. For example, a time stamp may be associated with the data block. After one or more stamps have been associated with the data block from block 601, the block may be transmitted to the CDP system 130, as shown in block 609. The data block and the one or more stamps may be transmitted in a single communication to the CDP system 130, or may be transmitted separately. For example, the data block may be transmitted via a dedicated input/output link between the system 100 and the CDP system 130, for example over a SCSI link. The one or more stamps may be transmitted separately via a network, for example over an ethernet link between the system 100 and the CDP system 130. Alternatively, the block and associated stamps may be held in a queue or cache mechanism on the system 100 so that multiple blocks and associated stamps may be transmitted to the CDP system 130 at once. The CDP system 130 may also employ a queue or cache mechanism so that multiple blocks and associated stamps may be stored in the CDP system 130. For example, a queue or cache mechanism may store one or more blocks and associated stamps so that the one or more blocks and associated stamps may be written to a hard disk drive at once.

An issue may arise in that different files may be modified at different times in the same block. For example, if at time T1, a file x.dat is modified in logical Block1, the system 100 may associate a stamp of T1 with Block1 and hold it in a queue or cache mechanism for later writing to the CDP system 130. If a file y.dat, which shares the same logical Block1 as x.dat, is modified at a time T2, then the system 100 may associate a stamp T2 to Block1, even though Block1 has not been transmitted to the CDP system 130. A second issue may arise if the system 100 modifies the same block again after a first modification before the first modified block is transmitted to the CDP system 130. For example, the system 100 may modify Block1 and may associate it with a stamp of T1. Block1 may be held in a queue or cache mechanism, but while it is in the queue or cache mechanism, the system 100 may modify Block1 again, and the system 100 may associate a new stamp of T2 to the twice-modified Block1.

One or more embodiments of the system 100 or method of the present disclosure may be operable to create one or more "shadow blocks" in order to maintain the integrity of the blocks and associated stamps. For example, if modified Block1 is in a queue or cache mechanism, and the system 100 modifies Block1 again, the system 100 may make a copy of Block1 and the associated stamp in the queue or cache mechanism, so that either the original Block1 or the copy of Block1 may be modified and associated with a new stamp.

At this point it should be noted that the operation of a system and method in accordance with the present disclosure as described above typically involves the processing of input data and the generation of output data to some extent. This input data processing and output data generation may be implemented in hardware or software. For example, specific electronic components may be employed in a system or similar or related circuitry for implementing the functions associated with creating modified data blocks or transmitting them to storage or memory or to a CDP system in accordance with the present disclosure as described above. Alternatively, one or more processors operating in accordance with stored instructions may implement the functions associated with the system or the continuous data protection system in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for creating file system checkpoints comprising the steps of:
    modifying a first data block and a second data block with a first transaction;
    associating the first data block with a first transmission time and a first stamp indicating a time value;
    transmitting the first data block and the first stamp to a continuous data protection system at the first transmission time;
    associating the second data block with a second transmission time and a second stamp indicating the time value;
    transmitting the second data block and the second stamp to the continuous data protection system at the second transmission time; and
    wherein the first transmission time occurs before the second transmission time.

2. A method according to claim 1, where a third data block is associated with a third stamp, where the third stamp is dissimilar to the first stamp and the second stamp and where the third block is modified by a second transaction.

3. A method according to claim 1, further comprising creating a shadow block of the second data block and associating the shadow block with a third stamp, where the third stamp is dissimilar to the first stamp and the second stamp and where the shadow block is modified by a second transaction.

4. At least one processor readable storage medium for storing a computer program of instructions configured to be readable by at least one processor for instructing the at least one processor to execute a computer process for performing the method as recited in claim 1.

5. A system for creating file system checkpoints comprising:
    an I/O module operable to transmit a first data block and a second data block;
    a stamp module operable to associate a first transmission time and a first stamp indicating a time value to the first data block and a second transmission time and a second stamp indicating the time value to the second data block before transmission by a CDP module; and
    the CDP module operable to transmit the first data block and the first stamp to one or more CDP systems at the first transmission time and the second data block and the second stamp to the one or more CDP systems at the second transmission time;
    wherein the first transmission time occurs before the second transmission time.

6. The system according to claim 5, where the I/O module, the CDP module, and the stamp module are in communication with each other.

7. The system according to claim 5 where the CDP module is in communication with a CDP system.

8. A system for creating file system checkpoints comprising:
    means for associating a first data block with a first transmission time and a first stamp indicating a time value;
    means for transmitting the first data block and the first stamp to a continuous data protection system at the first transmission time;
    means for associating a second data block with a second transmission time and a second stamp indicating the time value;
    means for transmitting the second data block and the second stamp to the continuous data protection system at the second transmission time; and
    wherein the first transmission time occurs before the second transmission time and wherein the first data block and the second data block are modified by a first transaction.

9. A system according to claim 8, where a third data block is associated with a third stamp, where the third stamp is dissimilar to the first stamp and the second stamp and where the third block is modified by a second transaction.

10. A system according to claim 8, further comprising creating a shadow block of the second data block and associating the shadow block with a third stamp, where the third stamp is dissimilar to the first stamp and the second stamp and where the shadow block is modified by a second transaction.

* * * * *